United States Patent
Marvie et al.

(10) Patent No.: US 9,672,652 B2
(45) Date of Patent: Jun. 6, 2017

(54) METHOD FOR PROCESSING A COMPUTER-ANIMATED SCENE AND CORRESPONDING DEVICE

(71) Applicant: THOMSON LICENSING, Issy de Moulineaux (FR)

(72) Inventors: Jean-Eudes Marvie, Betton (FR); Patrice Hirtzlin, Betton (FR); Olivier Mocquard, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 72 days.

(21) Appl. No.: 14/200,115

(22) Filed: Mar. 7, 2014

(65) Prior Publication Data
US 2014/0253561 A1   Sep. 11, 2014

(30) Foreign Application Priority Data

Mar. 11, 2013   (EP) .................................... 13305265

(51) Int. Cl.
*G06T 13/00*   (2011.01)
*G06T 13/80*   (2011.01)
(Continued)

(52) U.S. Cl.
CPC ............ *G06T 13/80* (2013.01); *G06F 9/5066* (2013.01); *G06T 13/00* (2013.01); *G06T 1/20* (2013.01);
(Continued)

(58) Field of Classification Search
CPC ......... G06T 2210/61; G06T 1/20; G06T 1/60; G06T 11/206; G06T 15/005; G06T 17/005; G06F 9/4443
See application file for complete search history.

(56) References Cited

U.S. PATENT DOCUMENTS

| 5,826,262 A * | 10/1998 | Bui ................... G06F 17/30625 |
| 6,505,228 B1 * | 1/2003 | Schoening ............ G06F 9/4887 709/223 |
| 2002/0063704 A1 | 5/2002 | Sowizral et al. |

FOREIGN PATENT DOCUMENTS

WO   WO2010004474   1/2010

OTHER PUBLICATIONS

Toub, "Parallelizing Operations With Dependencies", MSDN, Apr. 1, 2009, pp. 1-5, URL:<<https://msdn.microsoft.com/magazine/51d7f282-2725-47e5-ae35-6cd0a5235a46>>.*

(Continued)

*Primary Examiner* — Jacinta M Crawford
*Assistant Examiner* — Diane Wills
(74) *Attorney, Agent, or Firm* — Tutunjian & Bitetto, P.C.

(57) ABSTRACT

The invention is related to a method for processing a computer-animated scene, the computer-animated scene being represented with at least an animation graph, at least an animation graph comprising a plurality of nodes connected by paths, the paths being representative of dependencies between the nodes, at least an event being associated with each node, a first information representative of the type of each event being associated with each node. As to optimize the parallelization of the nodes, the method comprises a step of classifying the nodes in at least a first batch and at least a second batch according to the first information associated with each node, at least a first batch comprising nodes to be evaluated in parallel and at least a second batch comprising nodes to be evaluated sequentially.

14 Claims, 7 Drawing Sheets

Figure 1:
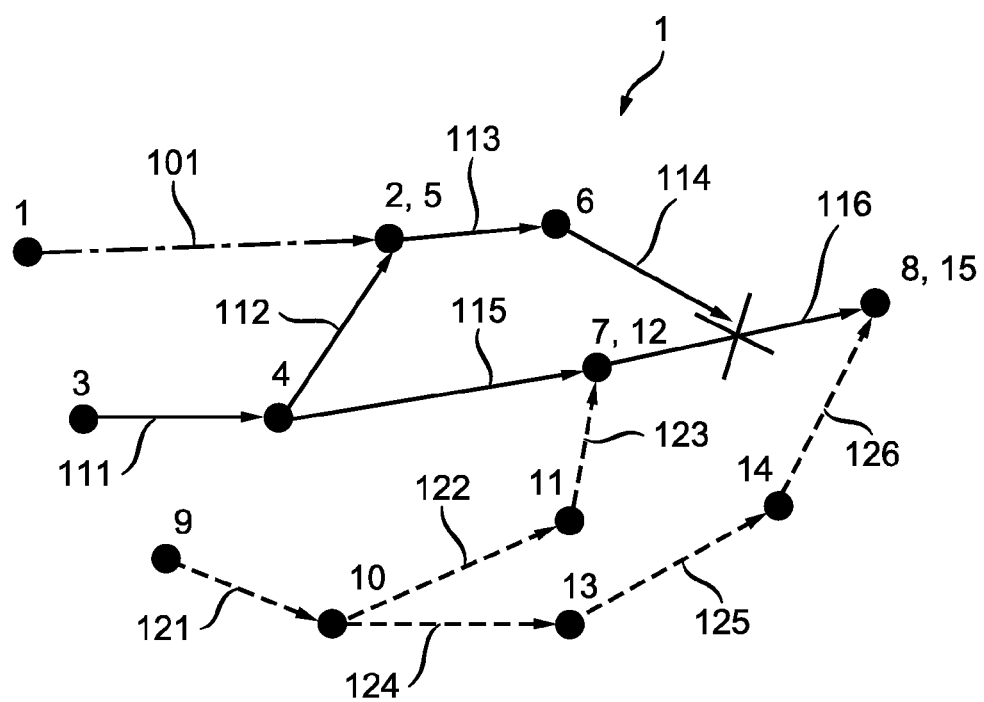

(51) Int. Cl.
*G06F 9/50* (2006.01)
*G06T 1/20* (2006.01)
(52) U.S. Cl.
CPC ...... *G06T 2210/52* (2013.01); *G06T 2210/61* (2013.01)

(56) References Cited

OTHER PUBLICATIONS

Carey et al., "The Annotated VRML97 Reference Manual", Chapter 2, Dec. 31, 1997, pp. 1-66, URL:<<http://www.cs.vu.nl/~eliens/documents/vrml/reference/BOOK.HTM>>.*
Carey etal: "The Annotated VRML97 Reference Manual ,Chapter 2,Key Concepts", Dec. 31, 1997 (Dec. 31, 1997), pp. 1-66.
Toub: "Parallelizing Operations With Dependencies", Apr. 1, 2009 (Apr. 1, 2009), pp. 1-5.
Orthmann etal: "Integrating GPGPU Functionality Into Scene Graphs", VMV 09, Jan. 1, 2009 (Jan. 1, 2009), pp. 1-10.
Marvie etal: Many-Core Event Evaluation, Proceedings of ACM SIGGRAPH WEB3D 2013. Jun. 2011. San Sebastien, Spain., Jun. 30, 2013 (Jun. 30, 2013), pp. 1-8.

Search Report Dated Aug. 28, 2013.
Budimlić et al., "Concurrent collections", Scientific Programming, vol. 18, No. 3, (2010), pp. 203-217.
Reinders, James, "Intel threading building blocks: outfitting C++ for multi-core processor parallelism", O'Reilly Media, Inc., Cambridge, Jul. 2007, pp. 1-334.
Repplinger et al., "DRONE: a flexible framework for distributed rendering and display", Advances in Visual Computing, Springer, Berlin, 2009, pp. 975-986.
Martin Watt, et al., LibEE: A Multithreaded Dependency Graph for Character Animation, DigiPro '12 Proceedings of the Digital Production Symposium, Aug. 4, 2012, pp. 59-66, ACM New York, NY, USA.
Jack B. Dennis, et al., A Preliminary Architecture for a Basic Data-Flow Processor, ISCA '75 Proceedings of the 2nd annual symposium on Computer architecture, ACM SIGARCH Computer Architecture News 3(4), Dec. 1974, pp. 126-132, vol. 3, Issue 4, ACM New York, NY, USA.
Felix Klein, et al., Xflow-Declarative Data Processing for the Web, Web3D '12 Proceedings of the 17th International Conference on 3D Web Technology, Aug. 4, 2012, pp. 37-45, ACM New York, NY, USA.

* cited by examiner

METHOD FOR PROCESSING A COMPUTER-ANIMATED SCENE AND CORRESPONDING DEVICE

This application claims the benefit, under 35 U.S.C. §119 of European Patent Application 13305265.4, filed Mar. 11, 2013.

1. DOMAIN OF THE INVENTION

The invention relates to the domain of image synthesis composition and animation of virtual scene and more specifically to the domain of parallel processing of events for animating the virtual scene.

2. PRIOR ART

According to the prior art, it is known to describe user interfaces, graphical object(s), the animation of the graphical object(s) over the time with a scene graph. In general, such a scene graph describes, usually in a hierarchical manner, e.g. a tree structure of nodes connected via paths, how graphical elements are arranged in space and time to compose a scene comprising one or more graphical objects. Graphical objects may be defined in a number of ways, such as using a skeleton and associated mesh, NURBS (Non Uniform Rational Basic Spline) surfaces, particles and the like. The position, orientation, deformation, scale and/or other properties of each graphical object may be animated over time, for example according to user's commands. The complexity of a scene, and then of the scene graph, depends on the number of graphical object(s), the complexity of the graphical object(s) and the complexity of the animation.

With the emergence of multi-processors system and/or multi-core processors, some of the tasks described in the scene graph, the execution of which being necessary for animating the scene, may be parallelized for speeding up the computation associated with the animation of the scene. Nevertheless, specific mechanisms and tasks associated with nodes of the scene graph strongly limit the parallelization abilities provided by multi-processors system and multi-core processors.

3. SUMMARY OF THE INVENTION

The purpose of the invention is to overcome at least one of these disadvantages of the prior art.

More specifically, the purpose of the invention is to optimize the parallelization of nodes and associated tasks/events for animating a scene.

The invention relates to a method for processing a computer-animated scene, the computer-animated scene being represented with at least an animation graph, the at least an animation graph comprising a plurality of nodes connected by paths, the paths being representative of dependencies between the nodes, at least an event being associated with each node, a first information representative of the type of each event being associated with each node. The method comprises a step of classifying the nodes in at least a first batch and at least a second batch according to the first information associated with each node, the at least a first batch comprising nodes to be evaluated in parallel and the at least a second batch comprising nodes to be evaluated sequentially.

According to a particular characteristic, the method further comprises:

identifying at least a prototype node among the nodes of the at least an animation graph according to a second information representative of node type associated with each node, classifying the at least a prototype node in at least a third batch, classifying the plurality of nodes of an animation graph associated with each prototype node in the at least a first batch and at least a second batch according to the at least a first information associated with each node of the animation graph.

Advantageously, the method further comprises evaluating in parallel the nodes of the at least a first batch and evaluating sequentially the nodes of the at least a second batch.

According to a specific characteristic, the method comprises the step of assigning the nodes to at least a cluster according to a third information associated with each node, the third information being representative of a dependency counter according to the dependencies between the nodes, one first batch and one second batch being associated with each cluster.

Advantageously, the step of assigning the nodes to at least a cluster comprises the steps of:

initializing the value of the third information associated with a node with the number of predecessor nodes to said node in the at least an animation graph, for the nodes having a third information value equal to zero, assigning said nodes to a first cluster, updating the third information associated with successor nodes of the nodes, in the at least an animation graph, of the first cluster by decrementing by one the third information value, for the nodes having an updated third information value equal to zero, assigning said nodes to a new cluster, reiterating the steps of updating and assigning to the new cluster until all nodes have been assigned to a cluster.

According to another characteristic, the first information takes two values, a first value being representative of an event associated with a node having no effect on the evaluation of another node, a second value being representative of an event having an effect on the evaluation of at least another node, nodes with an associated first information taking the first value being classified into the at least a first batch and nodes with an associated first information taking the second value being classified into the at least a second batch.

Advantageously, the method further comprises a step of rendering the computer-animated scene by executing the events associated with the classified nodes.

The invention also relates to a device configured for processing a computer-animated scene, the computer-animated scene being represented with at least an animation graph, the at least an animation graph comprising a plurality of nodes connected by paths, the paths being representative of dependencies between the nodes, at least an event being associated with each node, a first information representative of the type of each event being associated with each node, the device comprising at least a processor configured for classifying the nodes in at least a first batch and at least a second batch according to the first information associated with each node, the at least a first batch comprising nodes to be evaluated in parallel and the at least a second batch comprising nodes to be evaluated sequentially.

According to a particular characteristic, the at least a processor is further configured for:

identifying at least a prototype node among the nodes of the at least an animation graph according to a second information representative of node type associated with each node, classifying the at least a prototype node in at least a third batch, classifying the plurality of nodes of an animation graph associated with each prototype node in the at least a first batch and at least a second batch according to the at least a first information associated with each node of the animation graph.

Advantageously, the device comprises a plurality of processors configured for evaluating in parallel the nodes of the at least a first batch.

According to a specific characteristic, the at least a processor is further configured for assigning the nodes to at least a cluster according to a third information associated with each node, the third information being representative of a dependency counter according to the dependencies between the nodes, one first batch and one second batch being associated with each cluster.

Advantageously, the at least a processor is configured for:
initializing the value of the third information associated with a node with the number of predecessor nodes to said node in the at least an animation graph,
for the nodes having a third information value equal to zero, assigning said nodes to a first cluster,
updating the third information associated with successor nodes of the nodes, in the at least an animation graph, of the first cluster by decrementing by one the third information value,
for the nodes having an updated third information value equal to zero, assigning said nodes to a new cluster,
reiterating the steps of updating and assigning to the new cluster until all nodes have been assigned to a cluster.

According to another characteristic, the at least a processor is a multi-core processor.

Advantageously, the at least a processor is further configured for rendering the computer-animated scene by executing the events associated with the classified nodes.

The invention also relates to a computer program product, which comprises instructions of program code for executing steps of the processing method, when said program is executed on a computer.

4. LIST OF FIGURES

Figure 2:
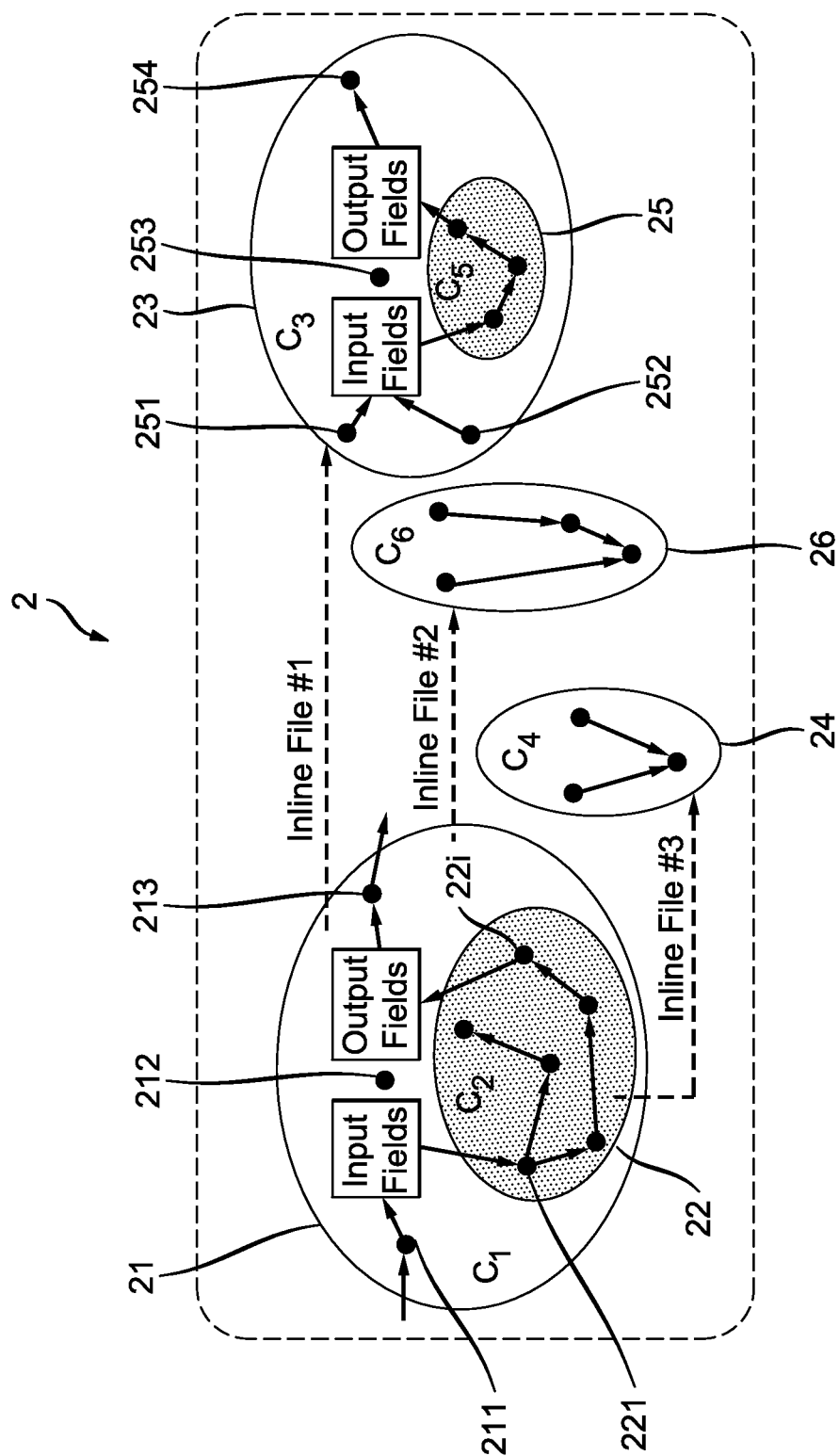
Figure 3:
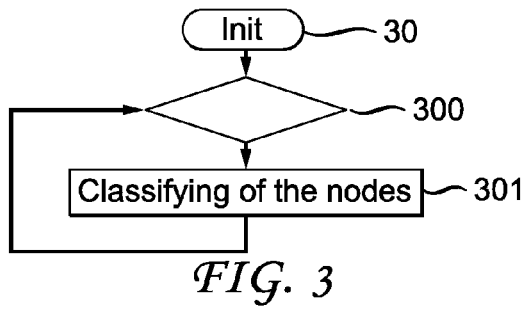
Figure 4A:
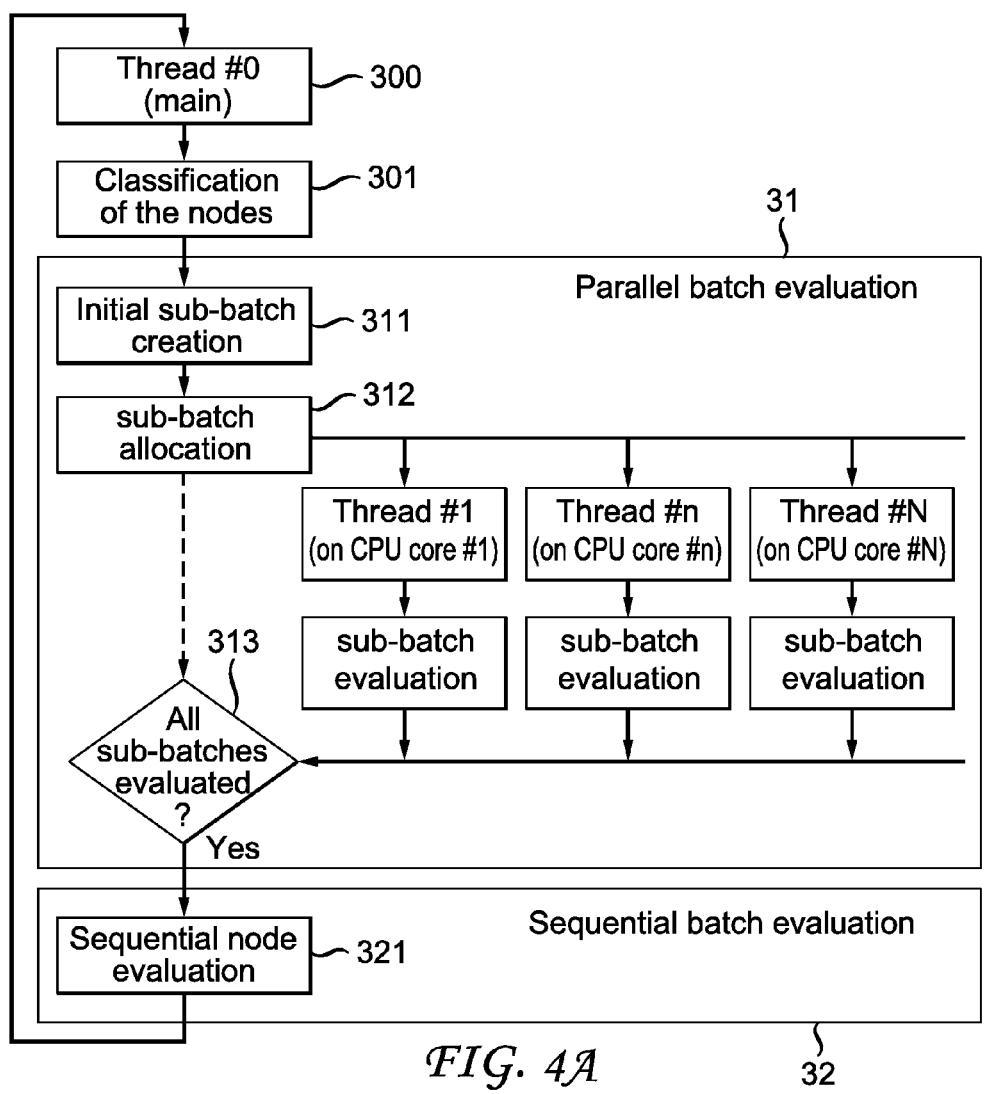
Figure 4B:
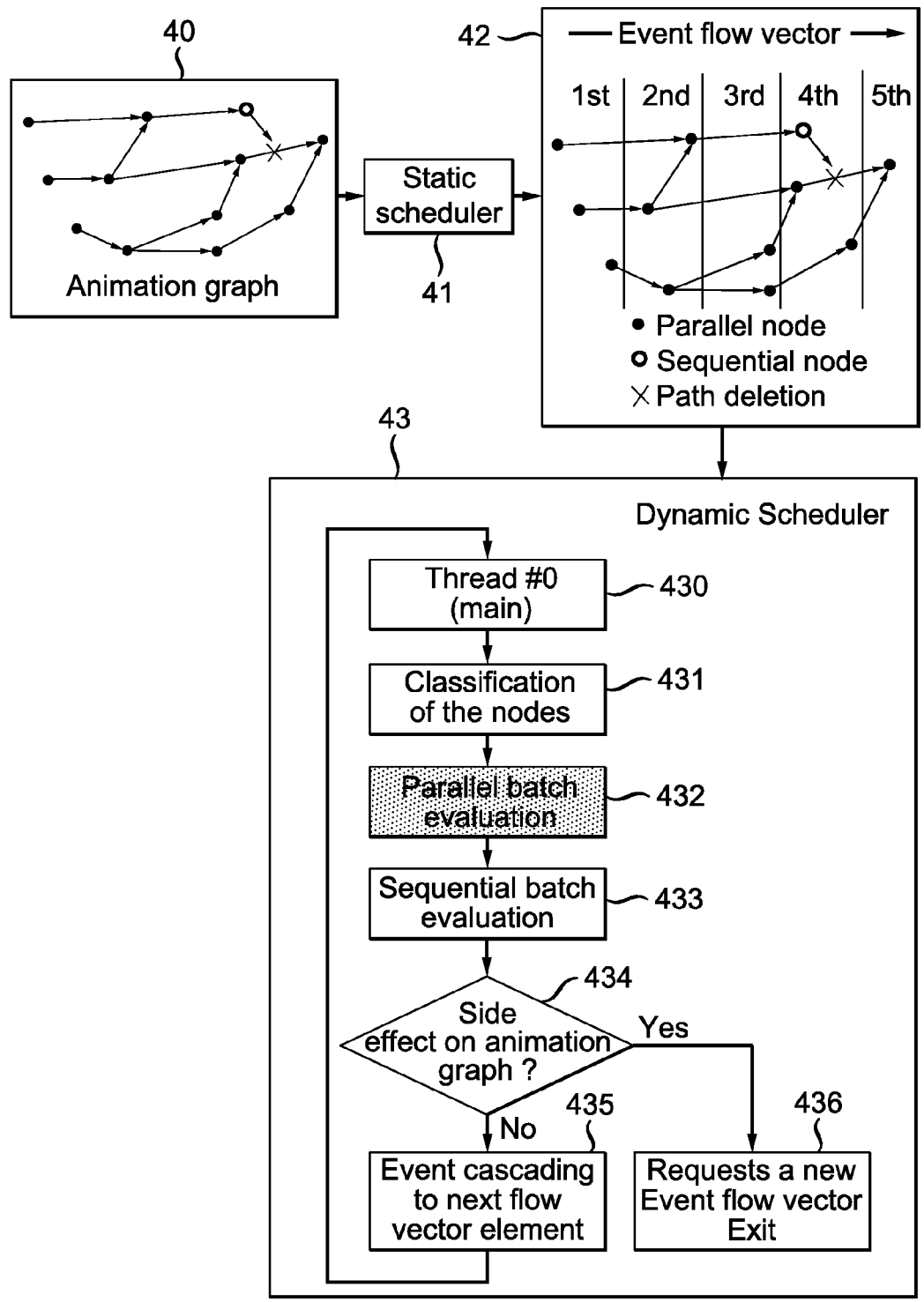
Figure 5:
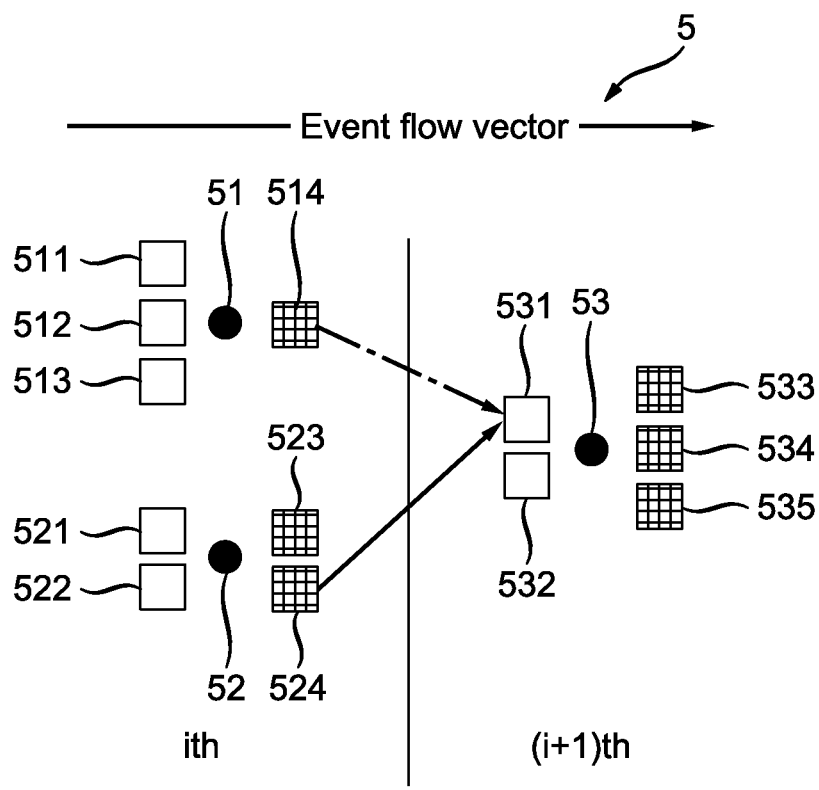
Figure 6A:
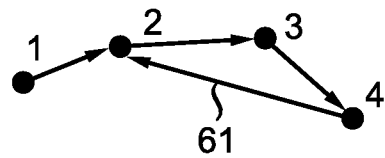
Figure 6B:
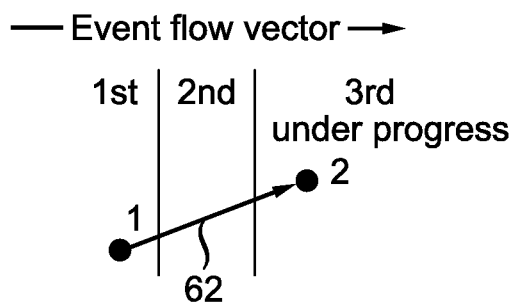
Figure 6C:
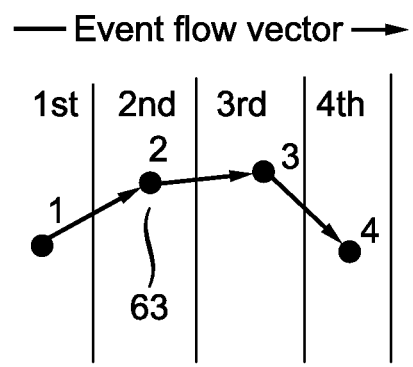
Figure 7:
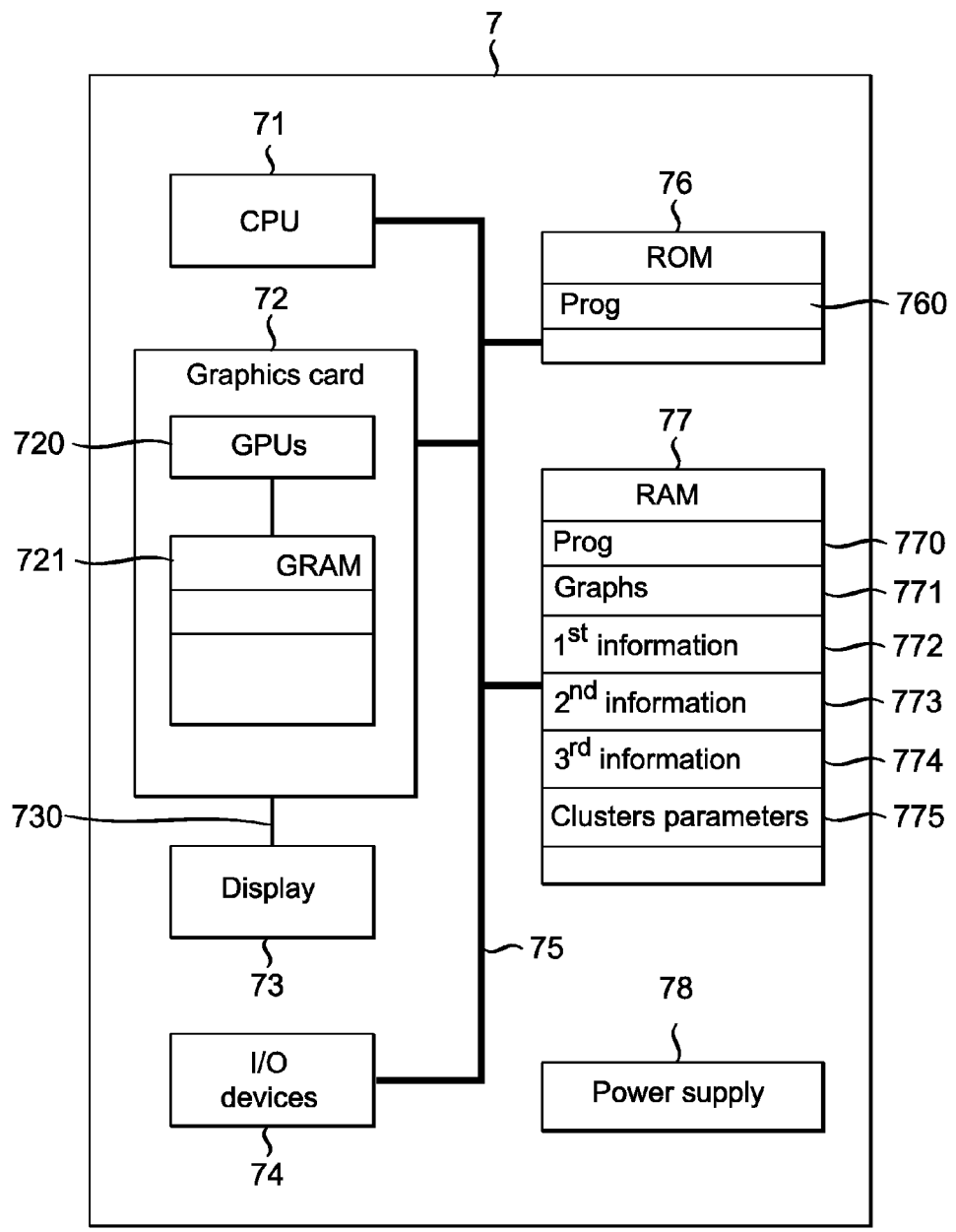

The invention will be better understood, and other specific features and advantages will emerge upon reading the following description, the description making reference to the annexed drawings wherein:

FIG. 1 diagrammatically shows an animation graph representative of a scene to be computer-animated, according to a particular embodiment of the invention, FIG. 2 diagrammatically shows animation contexts associated with the animation graph of FIG. 1, according to a particular embodiment of the invention, FIG. 3 illustrates a method for processing a computer-animated scene represented via the animation contexts of FIG. 2, according to a particular embodiment of the invention, FIGS. 4A and 4B illustrate two particular embodiments of a method for processing a computer-animated scene represented via the animation contexts of FIG. 2, according to two particular embodiments of the invention, FIG. 5 diagrammatically shows the cascading of events from some nodes to another node of one of the animation contexts of FIG. 2, according to a particular embodiment of the invention, FIGS. 6a, 6b and 6c diagrammatically show the processing of a loop in an animation context of FIG. 2, according to a particular embodiment of the invention, FIG. 7 diagrammatically shows a device implementing a method for processing a computer-animated scene represented via the animation contexts of FIG. 2, according to a particular implementation of the invention.

5. DETAILED DESCRIPTION OF EMBODIMENTS OF THE INVENTION

Generally but not restrictively, the invention relates to a method for processing a computer-animated scene, the scene being animated image after image of a sequence of images. The scene corresponds for example to a virtual scene developed for games, for an animation movie, or to a graphical user interface or to a web portal. The scene advantageously comprises one or more graphical objects, which are animated in space and over time in a predetermined manner or according to commands input by a user who interacts with the scene. The scene is advantageously describes with one or more animation graphs (one animation graph for simple animation of the scene and several animations graphs for complex animation of a scene and/or for a complex scene) by using VRML (Virtual Reality Markup Language) language for example, each animation graph comprising nodes connected by pairs with paths, the paths representing the dependencies between the nodes. One or more event(s) are associated with each node of the animation graph(s), these events being evaluated/executed at run-time for animating the scene. The processing method comprises advantageously the classifying of the nodes of each animation graph into first batch(es) and second batch(es), the first batch(es) comprising the nodes which are evaluable in parallel, by using different threads of one or more multi-core processor(s) and/or of several mono-core processors, the second batch(es) comprising the nodes that cannot be evaluated in parallel and that have to be evaluated in a time-sequential manner. The classifying of the nodes before the evaluation enables to parallelize at least a part of the tasks/events to be run for animating the scene instead of rejecting the parallelizing process as a whole when an animation graph comprises one or more nodes that cannot be evaluated in a parallel manner.

FIG. 1 diagrammatically shows an animation graph 1 (also called scene graph) used for representing the animation of a scene, according to a particular and non-restrictive embodiment of the invention. The animation graph 1 comprises a plurality of nodes represented by black points. The number of nodes can be any integer and is comprised between a couple a points and tens of thousands points. The animation graph 1 is advantageously a dependency graph (i.e. a directed graph) representing the dependencies between the nodes. A dependency between two nodes is represented with an arrow, which correspond to a path between the two nodes. The animation graph 1 comprises three event cascades, each event cascade being comprises several nodes. The first event cascade only comprises two nodes referenced 1 and 2, these two nodes being connected by the arrow 101 in long dash dot. The dependency between the two nodes 1 and 2 enables to derive an evaluation order between these two nodes along the first event cascade, meaning that node 1 has to be evaluated before node 2. The second event cascade comprises 6 nodes, i.e. nodes referenced 3, 4, 5, 6, 7 and 8, the node 5 being the node 2 of the first cascade. An evaluation order along the second event cascade is associated with each node of the second event cascade and corresponds to the references given to these nodes. The nodes 3 to 8 are connected with each other via the directed paths represented by the arrows 111, 112, 113, 114, 115 and 116. The third event cascade comprises 7 nodes, i.e. nodes referenced 9 to 15, nodes referenced 12 and 15 being shared with the second event cascade and corresponding respectfully to nodes 7 and 8 of the second event cascade. An evaluation order along the third event cascade is associated with each node of the second event cascade and corresponds to the references given to these nodes. The nodes 9 to 15 are connected with each other via the directed paths represented by the arrows 121, 122, 123, 124, 125, 126. One or more events are associated to the nodes of the animation graph 1. One or more input fields and one or more output fields are associated with each node of the scene graph 1. Event(s) associated with the nodes are advantageously of different types. For example, a first event type corresponds to an event, the evaluation/execution of which having an effect only on the node with which it is associated (the effect on the node corresponding for example to a change in the output field(s) associated with the node). An event of the first type is for example a change of position (vector x, y, z) that changes the position in space of an object via the translation field of a node 'Transform', according to VRML language. A second event type corresponds for example to an event, the evaluation/execution of which having an effect on one or more other nodes (i.e. node(s) different from the node with which the second type event is associated), i.e. having an effect on input field(s) associated with the one or more other nodes. An example of an event of the second type is the use of a node 'PositionInterpolator' (VRML language): a time fraction event (decimal value comprised between 0 and 1 corresponding to the animation fraction being run) is sent to the node 'PositionInterpolator' that calculates a new position in space (3D vector); this new position is a new event that is sent to the translation field of a node 'Transform' (VRML language) for modifying the position of an object. A third event type corresponds for example to an event, the evaluation/execution of which having an effect on the scene graph itself, i.e. generating a change in the graph at runtime, such as for example deletion of a path or of a node and/or an addition of a node. An event of the third type is illustrated in association with the node 6, the event associated with the node 6 (illustrated by the arrow 114) having as effect the deletion of the path 116, a time fraction event being sent to the Script. The Script then decides to add or delete a path according to the value of the time fraction and/*or according to a random variable. A first information representative of the type of an event associated with a node is advantageously associated with each node of the animation graph 1. According to an advantageous variant, a second information representative of the type of node is associated with each node of the animation graph 1. A first example of type node is "prototype node", which corresponds to a node with which is associated a sub-graph, the sub-graph comprising nodes connected with paths, as the animation graph 1. Nodes of a sub-graph may be of different types. A second example of type node is "script node", which corresponds to a node with a script associated to it, which means that the event(s) comprised in the script may be adapted and personalized by using programming language(s) such as JavaScript for example. A third example of type node is "sensor node", which corresponds to a node having interaction-driven event(s) associated with it, i.e. event(s) triggered for example by a user command or by a sensor activation (detection of a predetermined value by a sensor for example). A fourth example of type node is "inline node" or "inline file node", which corresponds to a node which may be considered to a pointer to another graph or sub-graph, which comprises nodes of any type connected with paths, events of any type being associated with the nodes. Such an "inline node" enables for example to reuse a graph already generated for animating a specific object or part of an object of the scene. A fifth example of type node is "standard node", which corresponds to any node, whose type is different from the ones of the first to fourth example previously described. A second information representative of the type of a node is advantageously associated with each node of the animation graph 1.

FIG. 2 illustrates different animations contexts associated with at least a part of the scene graph 1, according to a particular and non-restrictive embodiment of the invention. FIG. 2 illustrated six animation contexts $C_1$ 21, $C_2$ 22, $C_3$ 23, $C_4$ 24, $C_5$ 25 and $C_6$ 26, the combination of these six animation contexts $C_1$ to $C_6$ forming the scene graph. An animation graph is associated with each animation context, an animation graph corresponding to a graph for animating a scene or a part of a scene (for example a graphical object of the scene). In the rest of the description, the expressions "animation context" and "animation graph" will be considered as being equivalent and as referring to a same notion, i.e. a graph comprising nodes of any types connected with paths, event(s) of any types being associated with the nodes of each animation graph.

The animation graph associated with the animation context $C_1$ 21 comprises a plurality of nodes 211, 212, 213 with dependencies illustrated with arrows between them. The animation graph 21 as illustrated on FIG. 2 corresponds for example to a part of the animation graph 1 of FIG. 1. The node 211 is for example a standard node, the node 212 a prototype node and the node 213 a script node or a sensor node. The node 212 being a prototype node, an animation graph (or sub-graph in the sense that is associated/related with another graph 21 which may be considered as a main graph) is associated with it, this animation sub-graph corresponding to the animation context $C_2$ 22. A change in the input fields of the node 212 (for example triggered by an event associated with the node 211, which corresponds to the predecessor node of node 212 in the animation graph 21) triggers a change in the input field(s) associated with the node 221 of the animation graph 22 which is in direct dependency from the node 212. Following the dependencies between the i (i being an integer) nodes 221 to 22i, an event associated with the $i^{th}$ node 22i then triggers at least a change in the output fields of the node 212, which generates an event having an effect on the node 213 of the animation graph 21, node 212 being the predecessor node of the node 213 in the animation graph 21.

The animation graph 21 also comprises a first inline node pointing to the animation context $C_3$ 23, the animation context $C_3$ 23 being associated with the animation context $C_1$ 21 through the inline file mechanism. The animation graph 23 is independent from the animation graph 21 and may be processed as an adjacent animation graph. The inline file mechanism introduces a hierarchy between the different animation graphs 21 and 23 and enables to re-use an already-created graph (for example the animation graph 23), the combination of the animation graphs 21 and 23 forming a complex animation scheme. The animation graph 23 comprises a plurality of nodes 251, 252, 253 and 254, the nodes 251, 252 and 254 being for example sensor nodes and the node 253 being a prototype node. Events associated with the nodes 251 and 252 triggers change(s) in the input field(s) of the prototype node 253. An animation context $C_5$ 25 is associated with the prototype node, the associated animation 25 graph being hierarchically associated with the animation graph 23. The animation graph (or sub-graph) comprises a plurality of nodes connected with directed paths, the last node of the animation graph 25 circling back the prototype node 253 of the animation graph 23. The nodes of the animation graph 25 may be of any type, events associating with the nodes may also be of any type.

The animation graph 21 further comprises a second inline node pointing to the animation context $C_6$ 26, the animation context $C_6$ 26 being associated with the animation context $C_1$ 21 through the inline file mechanism, a hierarchical relationship being then established between the animation graphs 21 and 26. The animation graph 26 itself comprises nodes and paths, as any animation graph previously described.

The animation graph 22 comprises an inline node pointing to the animation context $C_4$ 24, the animation context $C_4$ 24 being associated with the animation context $C_2$ 22 through the inline file mechanism, a hierarchical relationship being then established between the animation graphs 22 and 24. The animation graph 24 itself comprises nodes and paths, as any animation graph previously described.

The combination of the six animation graphs 21 to 26 advantageously forms a scene graph 2 describing a whole scene, each of the animation graphs enabling to describe a part of the scene in order to animate this part of the scene. Naturally, the number of animation graph is not limited to six but extends to any number greater than or equal to 1.

FIG. 3 illustrates a method for processing a computer-animated scene represented via one or more animation contexts, for example based on the animation contexts 21 to 26, according to a first advantageous non-restrictive embodiment of the invention. Each of the animation graphs associated with the animation contexts 21 to 26 is processed on a thread of a processor, for example on the main thread of a multi-core processor.

At a first step 30, the parameters of the multi-core processor are initialized.

In a second step 300, a scheduler, for example a centralized scheduler associated with the main thread of the multi-core processor, selects an animation graph in a list comprising the animations graphs to be processed. Before selecting an animation graph, the scheduler checks if the first animation graph of the list has already been processed, for example by checking the value of a flag. If the value of the flag indicates that the first animation graph has already been processed, the scheduler checks the flag of the second animation graph in the list in step 301 and so on, until reaching the end of the list. If the flag of the first animation graph in the list has a value indicating that it has not been processed, this first animation graph is selected for being processed.

In a third step 301, nodes of the selected animation graph, for example the first animation graph 21, are classified in a first batch (a batch corresponding to a group of nodes) and in a second batch. The first batch comprises the nodes that will be evaluated in parallel during an evaluation step and the second batch comprises the nodes that will be evaluated sequentially during the evaluation step. The classification of a node of the first animation graph is based on the type of the event(s) associated with the node, i.e. the classification of the nodes in the first and second batches is done according to first information representative of the type of each event associated with each node. The classifying step enables to prepare the parallelization of the evaluation of the nodes for only the nodes which may be evaluated in parallel. Then, even if the first animation graph comprises one or more nodes which cannot be evaluated in parallel, it is possible to evaluate in parallel the part of the nodes that can be evaluated in parallel instead of rejecting the parallelization because of single nodes not adapted for the parallelization. The nodes whose evaluation may be performed in parallel advantageously corresponds to the node whose associated events are all of the first type, i.e. a node is classified in the first batch if each and every event associated with it is of the first type, which means that each and every event associated with it has no effect on any other node of the animation graph and has no effect on the graph animation itself. The nodes whose evaluation may not be performed in parallel but has to be performed sequentially are the nodes having at least an associated event of the second or third type, i.e. at least an event having an effect on at least another node of the animation graph or an effect on the animation graph itself.

According to a variant, the first information takes advantageously two values, a first value being representative of an event associated with a node having no effect on the evaluation of another node, a second value being representative of an event having an effect on the evaluation of at least another node, nodes with an associated first information taking the first value being classified into first batch(es) and nodes with an associated first information taking the second value being classified into the second batch(es).

According to another variant, a second information representative of the node type is associated with each node of the animation graph(s). The nodes of the prototype node type are advantageously classified in a third batch, which means that the prototype nodes are classified into the first batch or the second batch on one hand (depending from the type of event associated with these prototype nodes) and into the third batch on the other hand. For each animation graph, the node(s) of the prototype type are first identified according to the second information representative of node type associated with them. The node(s) of the prototype type is (are) then classified in the third batches and the nodes of each animation sub-graph associated with each of the prototype node(s) are also classified into the first and second batches in a same way as previously described with regard to step 301.

Once all the nodes of the first animation graph have been classified, the value of the flag indicating whether an animation graph has been processed is changed as to indicate that the animation graph has been processed. Then steps 300 and 301 are performed for the next animation graph of the list which has not been processed yet until each and every animation graph of the list has been processed.

Advantageously, the classification is done once per animation graph by a static scheduler. Nevertheless, if an animation graph is modified at runtime (for example during the evaluation of a node having an effect on the animation graph, such as the adding of nodes and/or paths, or the deletion of path(s) and/or node(s)), the classification is repeated at the next frame for this modified animation graph.

In an advantageous way, there is one first batch and one second batch associated with each animation graph.

FIG. 4A illustrates a method for processing a computer-animated scene represented via one or more animation contexts, for example based on the animation contexts 21 to 26, according to a second specific and non-restrictive embodiment of the invention.

Steps 300 and 301 are identical to the steps 300 and 301 described with regard to FIG. 3.

Step 31 illustrates the evaluation of nodes of an animation graph to be processed, for example the first animation graph 21, belonging to the first batch, these nodes corresponding to the nodes whose evaluations are parallelizable. Step 31 deals with the distribution of the nodes belonging to the first batch, also called parallel batch, among the available processing units for fast parallel evaluation of the nodes. A processing unit correspond to a thread associated with a core of a multi-core processor or to a thread associated with a processor in a multi-processor system. The number of thread corresponds to the number of available processing units to avoid thread concurrency.

According to a first option (called static strategy), a number of sub-batches is created (sub-step 311), the number of sub-batches created corresponding to the number of available processing units. Node(s) is (are) then allocated to each created sub-batch during a sub-batch allocation step 312. Each sub-batch comprises approximately the same number of nodes and is assigned to a thread. This static strategy requires less thread synchronization but may lead to unbalanced evaluation time for each thread.

According to a second option (called dynamic strategy), a node is allocated to each thread (i.e. a sub-batch contains a single node). Each thread evaluates the node and, once finished, takes another node until all the nodes have been evaluated, which is checked at 313. This strategy requires more thread synchronization but provides balanced evaluation time for each thread.

Step 32 illustrates the evaluation of the nodes comprised in the second batch, i.e. the nodes that cannot be evaluated in a parallel way and that are to be evaluated sequentially. The nodes of the second batch are thus evaluated one after each other.

Once all nodes of the current animation graph classified into the first and second batches have been evaluated, the steps 31 and 32 are reiterated for the nodes of the following animation graph until all nodes of all animation graphs have been processed, the steps 300 and 301 being reiterated only if the animation graph has been modified at runtime for the current frame.

FIG. 4B illustrates a method for processing a computer-animated scene represented via one or more animation contexts, for example based on the animation contexts 21 to 26, according to a second specific and non-restrictive embodiment of the invention.

In a first step 41, which corresponds to a task/event partitioning step, clusters of nodes to be evaluated are defined from an animation graph 40 (the animation graph 40 corresponding to any animation graph 21 to 26 of FIG. 2), the generated nodes clusters forming an event flow vector 42. An event flow vector 42 is generated for each animation graph 21 to 26. The ordering module performing step 41 aims at generating clusters of nodes to be evaluated in a specific order to meet the event evaluation dependencies as described in the animation graph. With each cluster (or element) of the five clusters of the event flow 42 (noted $1^{st}$, $2^{nd}$, $3^{rd}$, $4^{th}$ and $5^{th}$ on FIG. 4B) is associated a first batch and a second batch used during the classification step.

The event flow vector associated with an animation graph is generated cluster after cluster based on the node dependencies of the associated animation graph.

Firstly, a dependency counter is associated with each node of the animation graph as to assign the nodes to cluster(s) according to a third information representative of the dependency counter associated with the nodes, the dependency counter and consequently the third information being determined according to the dependencies existing between the nodes in the animation graph. The dependency counter is advantageously first initialized to the number of direct predecessors related to that node. Then, all the nodes having no predecessor (i.e. a null dependency counter) are placed in the first cluster (i=0) of the event flow vector. These nodes have no dependency and are ready to be evaluated. Each insertion of a node in a cluster of the event flow vector decrements the dependency counter of all its direct successors. For example, the insertion of the nodes in the first cluster decrements by one the dependency counter associated with the direct successors of the nodes assigned to the first cluster. All nodes having an updated dependency counter equal to zero are then assigned to a second cluster and the dependency counters of their direct successor in the animation graph are each decrements by one. The new nodes having then an updated dependency counter equal to zero are assigned to a third cluster and so on. To sum up, a cluster i (i≥1) of the event flow vector is created based on the following equation 1:

For all $n$ belonging to $V$/rank($n$)=$i$−1,

For all $n'$ belonging to Succ($n$)/$n'*c$=0=>rank($n'$)=$i$ (1)

Where n and n' are nodes of the animation graph, V is the event flow vector, rank(n) is the cluster of the event flow vector which contains the node n, Succ(n) is the set containing all the direct successors of node n in the animation graph and c is the node dependency counter.

The evaluation of some nodes (such as Script nodes) may cause non-deterministic side effects (addition/destruction of nodes/paths) on the animation graph itself at runtime. These nodes can be recognized through a flag or through the type of the event. The evaluation of these nodes requires synchronization to update the animation graph and hence cannot be performed in parallel to the other node evaluations. Therefore, each cluster of the event flow vector contains two node batches: a sequential batch (called second batch) for these specific nodes and a parallel batch (called first batch) for all the other nodes.

At runtime, by iterating each cluster of the event flow vector starting from its first cluster, all the nodes belonging to the first batch of the current vector element may be evaluated in parallel without any synchronization as all their dependencies have been solved and no resulting side effect on the animation graph itself is generated.

As illustrated on FIG. 6(a), an event could be generated twice within a same animation graph in the case of a loop, i.e. a node (referenced 2 on FIG. 6(a)) could be associated to two clusters of the event flow vector in the case of a loop 61. Indeed, in the example of FIG. 6(a), node 2 has two predecessors 1 and 4, one of them (node 4) being in dependency from node 2 via the node 3. When generating (as illustrated on FIG. 6(b)) the event flow vector associated with the example of FIG. 6(a) as described with regard with equation 1, the i−1 cluster 61 of the event flow vector is empty when a loop exists between the nodes to be inserted in the i cluster due to the condition of a null dependency counter. Therefore, all the successor nodes which have been visited but not inserted in the event flow vector due to the null dependency counter condition are tagged (for example with a tag "is Visited" taking the value TRUE). Then, once a loop is detected (empty i−1 vector cluster of the event flow vector), it is broken by forcing the addition 63 of a tagged node to this empty i−1 vector cluster, as illustrated on FIG. 6(c).

In order to manage efficiently non-deterministic side effects on the animation graph itself during the nodes evaluation, a centralized dynamic scheduler 43 running on the main thread is implemented for running steps 431 to 436. At runtime, the dynamic scheduler 43 iterates each cluster of the event flow vector associated with the current animation graph to be processed, starting from its first cluster to ensure that the event dependencies are met. The dynamic scheduler 43 performs the first batch (parallel batch) evaluation 432 and the second batch (sequential batch) evaluation 433, step 432 corresponding to the step 31 previously described with regard to FIG. 4A. Steps 430 and 431 correspond respectively to steps 300 and 301 previously described with regard to FIG. 3. The last step 434, 435 and 436 corresponds to an event cascading to the next cluster of the event flow vector, as it will be described below.

Steps 430 and 431 corresponding to steps 300 and 301 are not described in detail in this section. The result of these steps is a first batch and a second batch of nodes for the currently processed cluster of the event flow vector associated with the animation graph currently processed.

During step 432, the nodes belonging to the first batch are distributed among the available processing units for fast parallel evaluation. These nodes, which generally correspond to the majority of the nodes of the current event flow vector cluster, may be evaluated independently (i.e. without any synchronization) leading to a significant speedup with respect to a sequential node evaluation. Two options may be considered for the node distribution among the available processing units. A custom Pthread-based approach where a static thread pool is created and an OpenMP-based approach using a for loop which iterates on each node of the first batch. The number of threads corresponds to the number of available processing units to avoid thread concurrency. A static strategy creates a number of sub-batches corresponding to the number of available processing units. Each sub-batch contains approximately the same number of nodes and is assigned to a thread. This strategy requires less thread synchronization but can lead to unbalanced evaluation time for each thread. A dynamic strategy initially allocates a node to each thread (i.e. a sub-batch contains a single node). Each thread evaluates the node and, once finished, takes another node until all the nodes have been evaluated. This strategy requires more thread synchronization but provides balanced evaluation time for each thread.

During step 433, the evaluation of the nodes which may cause non-deterministic side effects on the animation graph itself is performed. These side effects include the destruction or addition of node or event path. In order to stop the node evaluation process as soon as a side effect has been detected (434, output Yes), each node of the second batch (sequential batch) is successively evaluated by the main thread. Once stopped, a new event flow vector is requested (436) to the static scheduler 41 at the next animation frame. If no side effect has been detected (output No), the next cluster of the event flow vector is considered, i.e. the $i+1^{th}$ cluster considering that the currently processed cluster corresponds to the $i^{th}$ cluster. The evaluation of the nodes belonging to the first batch (parallel batch) and to the second batch (sequential batch) of the current event flow vector cluster may generate new events (e.g. a change in the output fields associated with the nodes of the $i^{th}$ cluster).

In step 435, and as illustrated on FIG. 5, these new events are cascaded to the input fields of the nodes belonging to the next cluster ($i+1^{th}$ cluster) of the event flow vector. For example, considering that the ith cluster comprises two nodes 51 and 52, node 51 having three input fields 511, 512 and 513 and one output field, node 52 having two input fields 521 and 522 and two output fields 523 and 524. The $(i+1)^{th}$ cluster comprises one node 53, the node 53 having two input fields 531 and 532 and three output fields 533, 534 and 535. According to the animation graph associated with the event flow vector 5, node 53 is in dependency from its successor nodes 51 and 52. According to the animation graph, a change in the output field 514 of node 51 triggers an event having an effect on the input field 531 of node 53 and a change in the output field 524 of node 52 triggers an event having an effect on the input field 532 of node 53. In the case of a parallel event cascading, time-consuming synchronization steps are required before accessing to the input fields of nodes belonging to several cascades. Moreover, this cascading step requires sequential read and write memory accesses for each event value. Therefore the event cascading step is performed sequentially as no significant parallelism gain can be obtained.

Once all nodes of a cluster i of an event flow vector have been classified and evaluated, nodes of the following cluster (i+1) of the event flow vector are classified and evaluated. Once all nodes of an event flow vector have been processed, next event flow vector associated with another animation graph is processed, cluster after cluster. All event flow vectors are then processed for a current image and then for the following images of a sequence of images (the animations graphs being thus all processed for each image of a sequence of images).

FIG. 7 diagrammatically shows a hardware embodiment of a device 7 adapted for the processing of a computer-animated scene described with one or more animations graphs and for the creation of display signals of one or several images. The device 7 corresponding for example to a personal computer PC, a laptop or a games console or any processing device comprising processors or multi-core processor(s).

The device 7 comprises the following elements, connected to each other by a bus 75 of addresses and data that also transports a clock signal:
  at least one multi-core microprocessor or several microprocessors 71 (or CPUs),
  a graphics card 72 comprising:
    several Graphical Processor Units (or GPUs) 720,
    a Graphical Random Access Memory (GRAM) 721,
  a non-volatile memory of ROM (Read Only Memory) type 76,
  a Random Access Memory or RAM 77,
  one or several I/O (Input/Output) devices 74 such as for example a keyboard, a mouse, a webcam, and
  a power source 78.

The device 7 also comprises a display device 73 of display screen type directly connected to the graphics card 72 to display notably the displaying of synthesized images calculated and composed in the graphics card, for example live. The use of a dedicated bus to connect the display device 73 to the graphics card 72 offers the advantage of having much greater data transmission bitrates and thus reducing the latency time for the displaying of images composed by the graphics card. According to a variant, a display device is external to the device 7 and is connected to the device 7 by a cable transmitting the display signals. The device 7, for example the graphics card 72, comprises a means for transmission or connection (not shown in FIG. 7) adapted to transmit a display signal to an external display means such as for example an LCD or plasma screen or a video-projector.

It is noted that the word "register" used in the description of memories 72, 76 and 77 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor(s) 71 loads and executes the instructions of the program contained in the RAM 77.

The random access memory 77 notably comprises:
in a register 770, the operating program of the microprocessor(s) 71 responsible for switching on the device 7,
parameters 771 representative of the animation graph(s), i.e. parameters representative of the nodes (for example input and output fields associated with a node, event(s) associated with a node) and/or parameters representative of directed paths connecting the pair of nodes,
first information 772 representative of the type of event associated with the nodes,
second information 773 representative of the type of node,
third information 774 representative of dependency counter associated with the nodes,
parameters 775 representative of the clusters of the event flow vectors associated with the animation graphs.

The algorithms implementing the steps of the method specific to the invention and described hereafter are stored in the memory RAM 77 associated with the device 6 implementing these steps. When switched on and once the parameters 770 representative of the animation graph(s) environment are loaded into the RAM 77, the microprocessor(s) 71 execute the instructions of these algorithms.

According to a variant, the parallel evaluations of the nodes of the first batch(es) are performed by the GPUs of the graphical card, once all information and parameters related to the nodes and to the clusters are loaded into the GRAM 721 associated with the GPUs. According to another variant, information and parameters related to the nodes and to the clusters are not loaded into the GRAM 721, the GPUs accessing these data directly on the RAM 77.

According to another variant, the power supply 78 is external to the device 7.

Naturally, the invention is not limited to the embodiments previously described.

In particular, the invention is not limited to a method for processing a computer-animated scene but extends to a method for classifying the nodes of one or more animation graphs and/or to a method for evaluating the nodes of one or more animation graphs and/or to a method for animating a scene and/or to a method for rendering image(s) of the animated scene by executing the events associated with the classified nodes. The invention is also related to any device configured for implementing these methods.

The use of the invention is not limited to a live utilisation but also extends to any other utilisation, for example for processing known as postproduction processing in a recording studio for the animation of a scene or the display of synthesis images for example. The implementation of the invention in postproduction as well as in real time offers the advantage of providing an excellent visual display in terms of realism notably while reducing the required calculation time thanks to the optimization of the parallelization of the tasks/events associated with the nodes of the animation graph(s).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The present invention may be used in video game applications for example, whether via programs that can be executed in a PC or portable type computer or in specialised game consoles producing and displaying images live. The present invention may also be used for animating any graphical user interface or web portal, with or without interaction with a user. The device 7 described with respect to FIG. 7 is advantageously equipped with interaction means such as a keyboard and/or joystick, other modes for introduction of commands such as for example vocal recognition being also possible.

The invention claimed is:

1. A method of processing a computer-animated scene, wherein the computer-animated scene is represented with at least one animation graph, the at least one animation graph comprising a plurality of nodes connected by paths, the paths being representative of dependencies between the plurality of nodes, at least an event being associated with each node, a first information representative of the type of each event being associated with each node, the method comprising:
classifying the plurality of nodes into at least a first batch and at least a second batch according to the first information associated with each node, the at least a first batch comprising only nodes to be evaluated in parallel and the at least a second batch comprising only nodes to be evaluated sequentially; and
rendering the computer-animated scene by executing the events associated with the classified nodes.

2. The method according to claim 1, further comprising:
identifying at least one prototype node among the plurality of nodes of the at least one animation graph according to a second information representative of node type associated with each node;
classifying the at least one prototype node into at least a third batch; and
classifying the plurality of nodes of the at least one animation graph associated with each prototype node into the at least a first batch and the at least a second batch according to the at least a first information associated with each node of said at least one animation graph.

3. The method according to claim 1, further comprising evaluating in parallel the nodes of the at least a first batch and evaluating sequentially the nodes of the at least a second batch.

4. The method according to claim 1, further comprising assigning the plurality of nodes to at least one cluster according to a third information associated with each node, said third information being representative of a dependency counter according to the dependencies between the nodes, one first batch and one second batch being associated with each cluster.

5. The method according to claim 4, wherein assigning the plurality of nodes to the at least one cluster comprises:
a) initializing the value of the third information associated with a node with the number of predecessor nodes to said node in the at least one animation graph;
b) for the nodes having a third information value equal to zero, assigning said nodes to a first cluster;
c) updating the third information associated with successor nodes of the nodes, in the at least one animation graph, of the first cluster by decrementing the third information value by one;
d) for the nodes having an updated third information value equal to zero, assigning said nodes to a new cluster; and
e) reiterating steps c) and d) until all nodes have been assigned to a cluster.

6. The method according to claim 1, wherein the first information takes two values, a first value being representative of an event associated with a node having no effect on the evaluation of another node, a second value being representative of an event having an effect on the evaluation of at least another node, nodes with an associated first information taking the first value being classified into the at least a first batch and nodes with an associated first information taking the second value being classified into the at least a second batch.

7. A device configured to process a computer-animated scene, wherein the computer-animated scene is represented with at least one animation graph, the at least one animation graph comprising a plurality of nodes connected by paths, the paths being representative of dependencies between the plurality of nodes, at least an event being associated with each node, a first information representative of the type of each event being associated with each node, the device comprising at least one processor configured to:
classify the plurality of nodes into at least a first batch and at least a second batch according to the first information associated with each node, the at least a first batch comprising only nodes to be evaluated in parallel and the at least a second batch comprising only nodes to be evaluated sequentially; and
render the computer-animated scene by executing the events associated with the classified nodes.

8. The device according to claim 7, wherein the at least one processor is further configured to:
identify at least one prototype node among the plurality of nodes of the at least one animation graph according to a second information representative of node type associated with each node;
classify the at least one prototype node into at least a third batch; and
classify the plurality of nodes of the at least one animation graph associated with each prototype node into the at least a first batch and the at least a second batch according to the at least a first information associated with each node of said at least one animation graph.

9. The device according to claim 7, further comprising a plurality of processors configured to evaluate in parallel the nodes of the at least a first batch and evaluate sequentially the nodes of the at least a second batch.

10. The device according to claim 7, wherein the at least one processor is further configured to assign the plurality of nodes to at least one cluster according to a third information associated with each node, said third information being representative of a dependency counter according to the dependencies between the plurality of nodes, one first batch and one second batch being associated with each cluster.

11. The device according to claim 10, wherein the at least one processor is further configured to:
 a) initialize the value of the third information associated with a node with the number of predecessor nodes to said node in the at least one animation graph;
 b) for the nodes having a third information value equal to zero, assign said nodes to a first cluster;
 c) update the third information associated with successor nodes of the nodes, in the at least one animation graph, of the first cluster by decrementing the third information value by one;
 d) for the nodes having an updated third information value equal to zero, assign said nodes to a new cluster; and
 e) reiterate operations c) and d) until all nodes have been assigned to a cluster.

12. The device according to claim 10, wherein the at least one processor is a multi-core processor.

13. The device according to claim 7, wherein the first information takes two values, a first value being representative of an event associated with a node having no effect on the evaluation of another node, a second value being representative of an event having an effect on the evaluation of at least another node, nodes with an associated first information taking the first value being classified into the at least a first batch and nodes with an associated first information taking the second value being classified into the at least a second batch.

14. A non-transitory processor readable medium having stored therein instructions for causing a processor to perform at least a step of the method according to claim 1.

* * * * *